United States Patent [19]
Huang

[11] Patent Number: 6,065,611
[45] Date of Patent: May 23, 2000

[54] COMBINATION RACK FOR HOLDING A COMPUTER MAINFRAME AND AN EXPANSION UNIT

[75] Inventor: Meng-Chou Huang, Taipei, Taiwan

[73] Assignee: First International Computer, Inc., Taipei, Taiwan

[21] Appl. No.: 09/206,555

[22] Filed: Dec. 8, 1998

[51] Int. Cl.⁷ ........................................ A47F 7/00
[52] U.S. Cl. .................................................. 211/26
[58] Field of Search ....................... 21/26, 184, 175, 21/43, 13.1–26.2, 71.01, 72, 126.1

[56] References Cited

U.S. PATENT DOCUMENTS

| | | | |
|---|---|---|---|
| 4,395,955 | 8/1983 | Pfeifer | 211/184 |
| 4,768,661 | 9/1988 | Pfeifer | 211/184 |
| 4,845,591 | 7/1989 | Pavie | 211/26 |
| 5,054,623 | 10/1991 | Evenson | 211/184 |
| 5,626,406 | 5/1997 | Schmid | 211/26 |
| 5,845,789 | 12/1998 | Heigl | 211/26 |

*Primary Examiner*—Alvin Chin-Shue
*Assistant Examiner*—Sarah Purol
*Attorney, Agent, or Firm*—Rosenberg, Klein & Lee

[57] ABSTRACT

A combination rack includes a partition frame, and two side frames fastened to the partition frame at two opposite lateral sides, the side frames and the partition frame having respective flat front and rear fenders respectively matched together in a flash manner, and respective bottom coupling plates respectively matched together in a flush manner and fixed together by hook means and screws to hold a computer mainframe and an expansion unit at two opposite sides of the partition frame between the front fenders and the rear fenders, the partition frame having an elongated through hole through which a bus line is inserted and connected between the computer mainframe and the expansion unit for signal transmission.

4 Claims, 6 Drawing Sheets

COMBINATION RACK FOR HOLDING A COMPUTER MAINFRAME AND AN EXPANSION UNIT

BACKGROUND OF THE INVENTION

The present invention relates to a combination rack for holding a computer mainframe and at least one expansion unit, and more particularly to such a combination rack which comprises two side frames and at least one partition frame coupled between the side frames, the at least one partition frame each having a longitudinal through hole through which a bus line is inserted.

In order to increase the capability of a computer, expansion cards may be plugged into the computer. Because a computer has a limited number of sockets for receiving expansion cards, an expansion unit is needed to receive extra cards. When a computer system and an expansion unit are used, the user may directly put the computer mainframe of the computer system and the expansion unit on the top of the computer table, and then connect a bus line between the computer mainframe and the expansion unit for signal transmission. This arrangement cannot keep the computer mainframe and the expansion unit firmly in place.

SUMMARY OF THE INVENTION

It is one object of the present invention to provide a combination rack for holding a computer mainframe and at least one expansion unit which can be conveniently assembled. It is another object of the present invention to provide a combination rack which can be extended subject to the number of expansion units to be carried. According to the present invention, the combination rack comprises at least one partition frame, and two side frames fastened to the at least one partition frame at two opposite lateral sides, the side frames and the at least one partition frame having respective flat front and rear fenders respectively matched together in a flash manner, and respective bottom coupling plates respectively matched together in a flush manner and fixed together by hook means and screws to hold a computer mainframe and at least one expansion unit between the front fenders and the rear fenders. Each of the at least one partition frame has an elongated through hole through which a bus line is inserted and connected between the computer mainframe and one expansion unit or between two expansion units for signal transmission.

DETAILED DESCRIPTION OF THE PREFERRED EMBODIMENT

Figure 1:
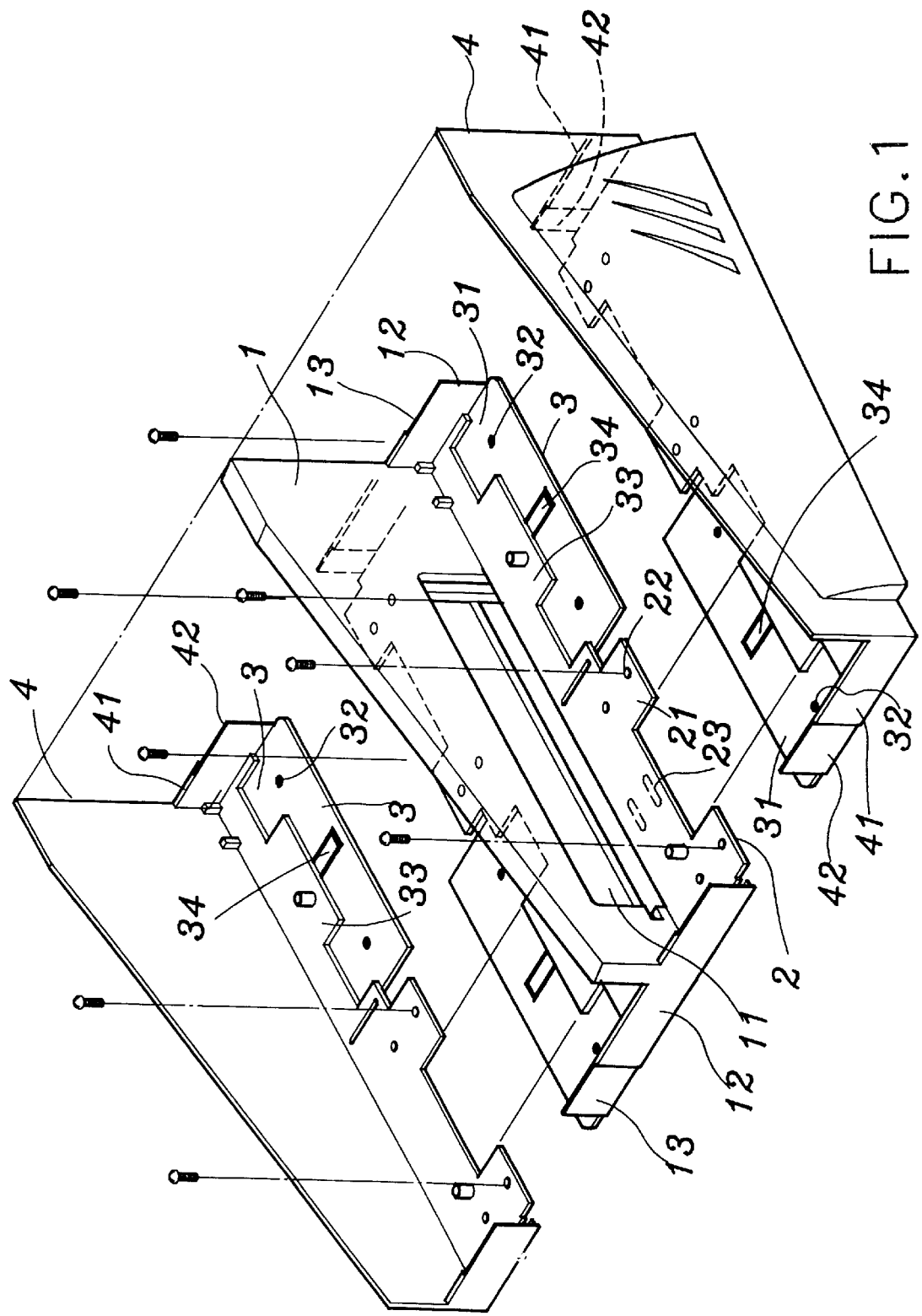
FIG. 1 is an exploded view of a combination rack according to the present invention.
Figure 2:
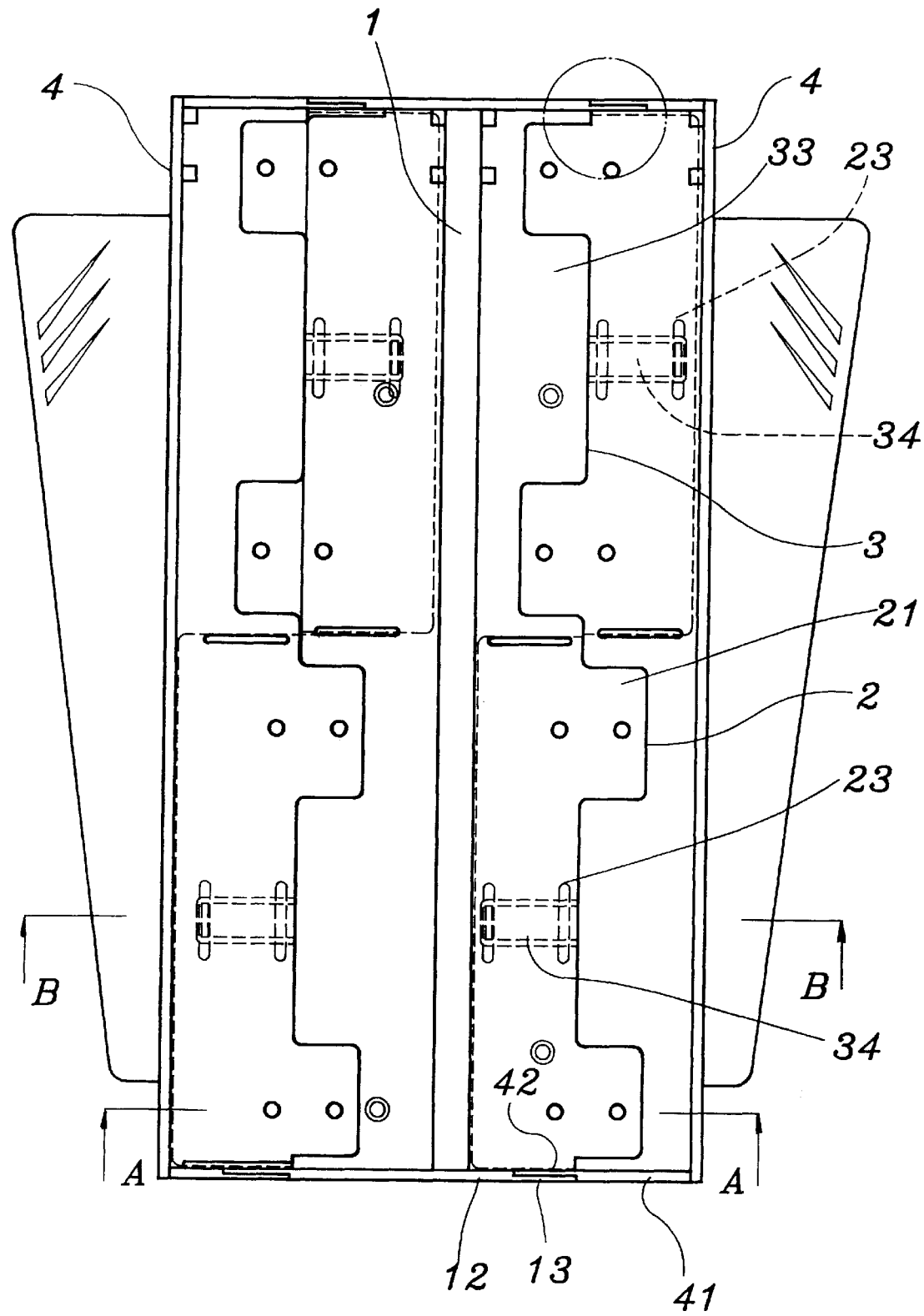
FIG. 2 is a top view of the present invention, showing the combination rack assembled.

Referring to FIGS. 1 and 2, a combination rack for holding a computer mainframe and an expansion unit in accordance with the present invention is generally comprised of a partition frame 1, and two symmetrical side frames 4 fastened to the partition frame 1 at two opposite sides.

The partition frame 1 comprises two flat fenders 12 respectively transversely disposed at front and rear sides thereof, each fender 12 having two flat coupling flanges 13 reversely disposed at two opposite sides, an elongated through hole 11 longitudinally spaced between the flat fenders 12 near the bottom. Each side frame 4 comprises two flat fenders 41 respectively perpendicularly extended from front and rear sides thereof, each fender 41 having a flat coupling flange 42 for coupling to the flat coupling flanges 13 of the flat fenders 12 of the partition frame 1. One first horizontal coupling plate 2 and one second horizontal coupling plate 3 are provided at each side frame 4 and each lateral side of the partition frame 1 at the bottom. By fastening the first horizontal coupling plate 2 and second horizontal coupling plate 3 of each side frame 4 to the second horizontal coupling plate 3 and first horizontal coupling plate 2 at each lateral side of the partition frame 1, the side frames 4 and the partition frame 1 are fastened together. The first horizontal coupling plate 2 comprises two forward projections 21 arranged in parallel at two sides, two mounting slots 23 arranged in parallel on the middle, and two pairs of screw holes 22 respectively provided at the forward projections 21. The second horizontal coupling plate 3 comprises a flat, raised portion 33 integral with the corresponding first horizontal coupling plate 2 in a flush manner, a flat, recessed portion 31, two screw holes 32 provided at the recessed portion 31 at two sides, and a springy hook 34 raised from the recessed portion 31 on the middle.

Figure 3A:
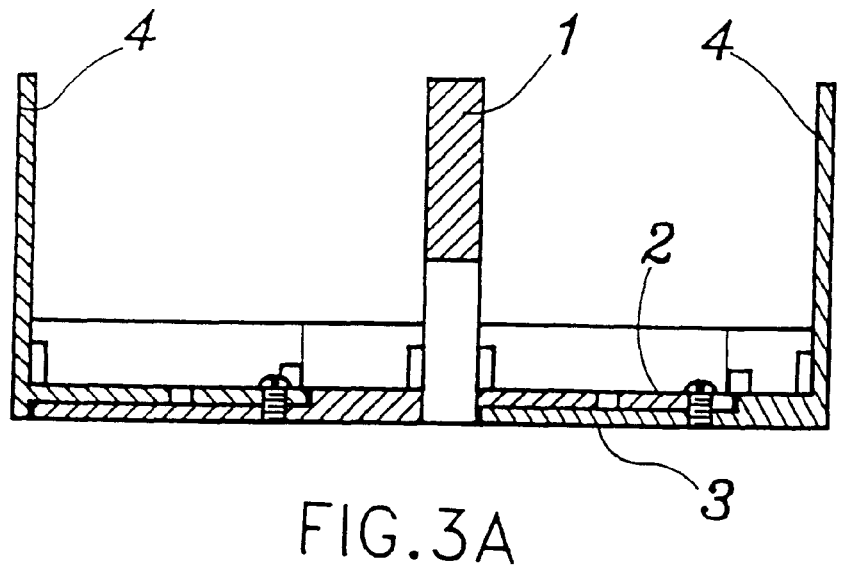
FIG. 3 is a sectional view taken along line A—A of FIG. 2.
FIG. 3B sectional view taken along line B—B of FIG. 2.
Figure 3B:
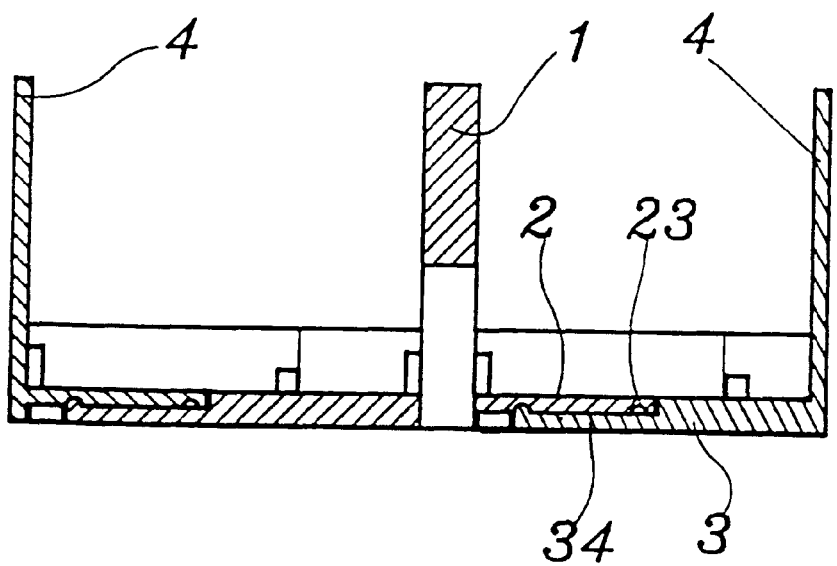
Figure 4:
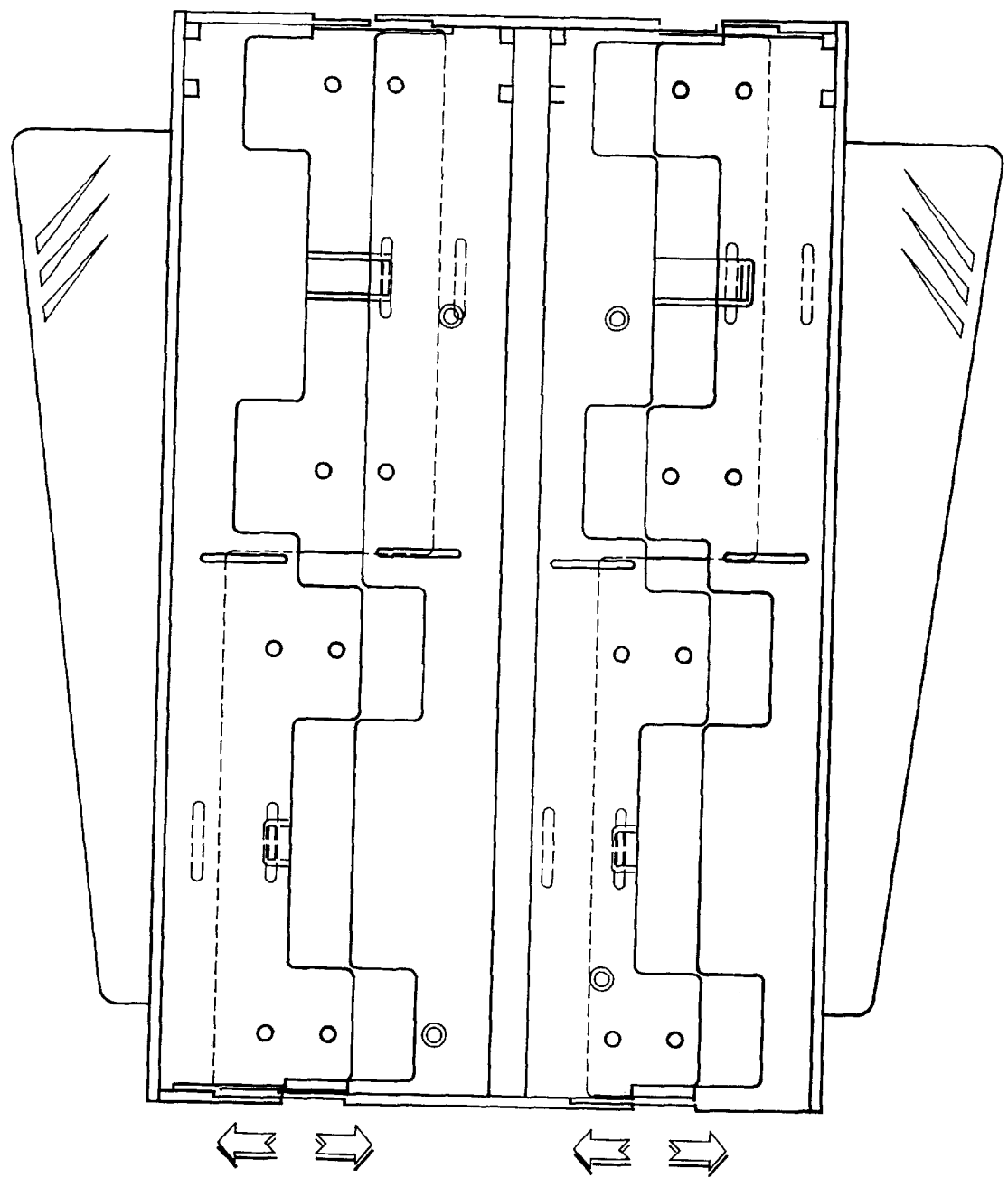
FIG. 4 is similar to FIG. 2 but showing the pitch between the partition frame and the side frames adjusted.
Figure 5:
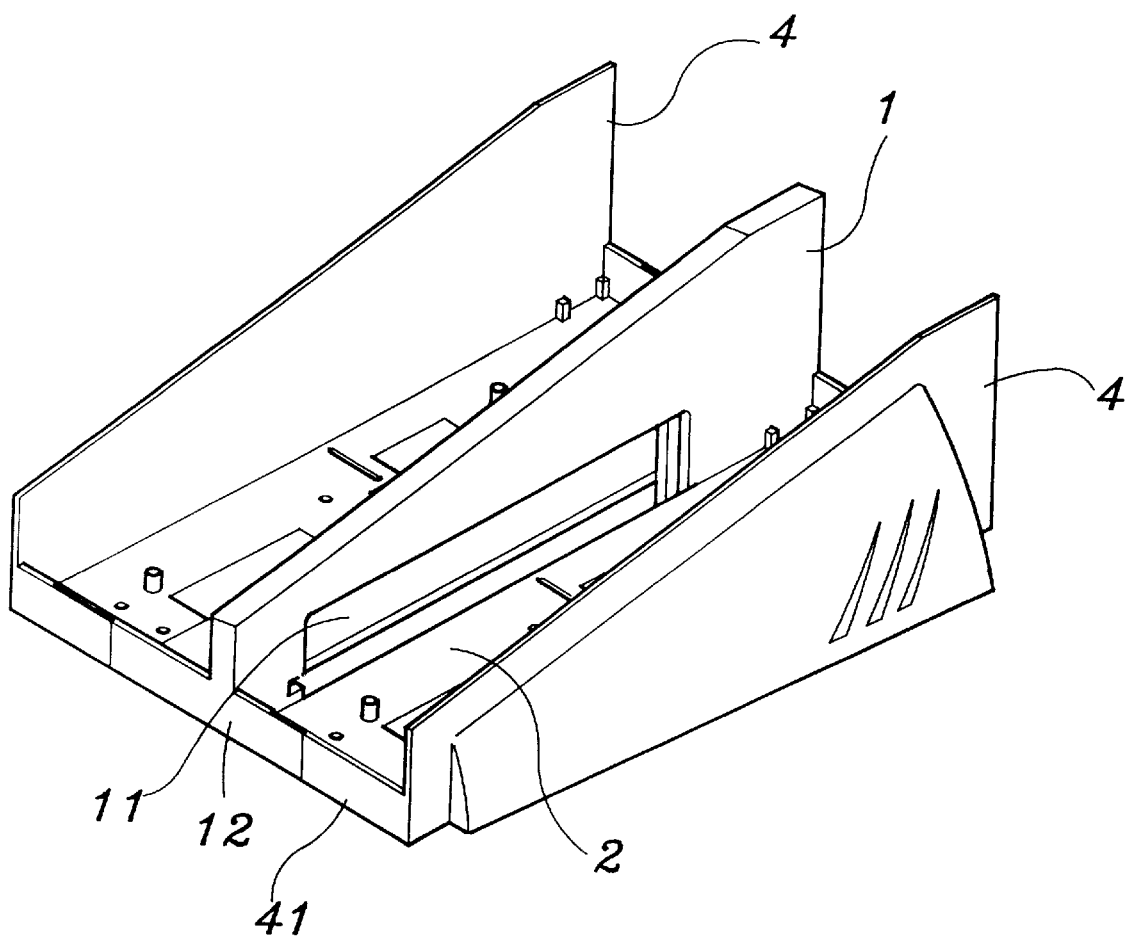
FIG. 5 is an elevational view of the combination rack according to the present invention.

Referring to Figures from 3 through 5 and FIG. 2 again, when the side frames 4 are respectively attached to the partition frame 1 at two opposite lateral sides, the flat coupling flanges 42 of the flat fenders 41 of the side frames 4 are respectively matched with the flat coupling flanges 13 of the flat fenders 12 of the partition frame 1, the first horizontal coupling plates 2 of the partition frame 1 are respectively matched with the recessed portions 31 of the second horizontal coupling plates 3 of the side frames 4, and the first horizontal coupling plates 2 of the side frames 4 are respectively matched with the second horizontal coupling plates 3 of the partition frame 1. When matched, the springy hook 34 of one second horizontal coupling plate 3 is hooked in one mounting slot 23 at the matched first horizontal coupling plate 2, and the screw holes 32 at the recessed portion 31 of one second horizontal coupling plate 3 are respectively fastened to the screw holes 22 at the matched first horizontal coupling plate 2 by screws (see FIG. 5). Further, by selectively fastening the springy hook 34 of one second horizontal coupling plate 3 to one of the mounting slots 23 at the matched first horizontal coupling plate 3, the pitch between the partition frame 1 and one side frame 4 is relatively adjusted (see FIGS. 3 and 4).

Figure 6:
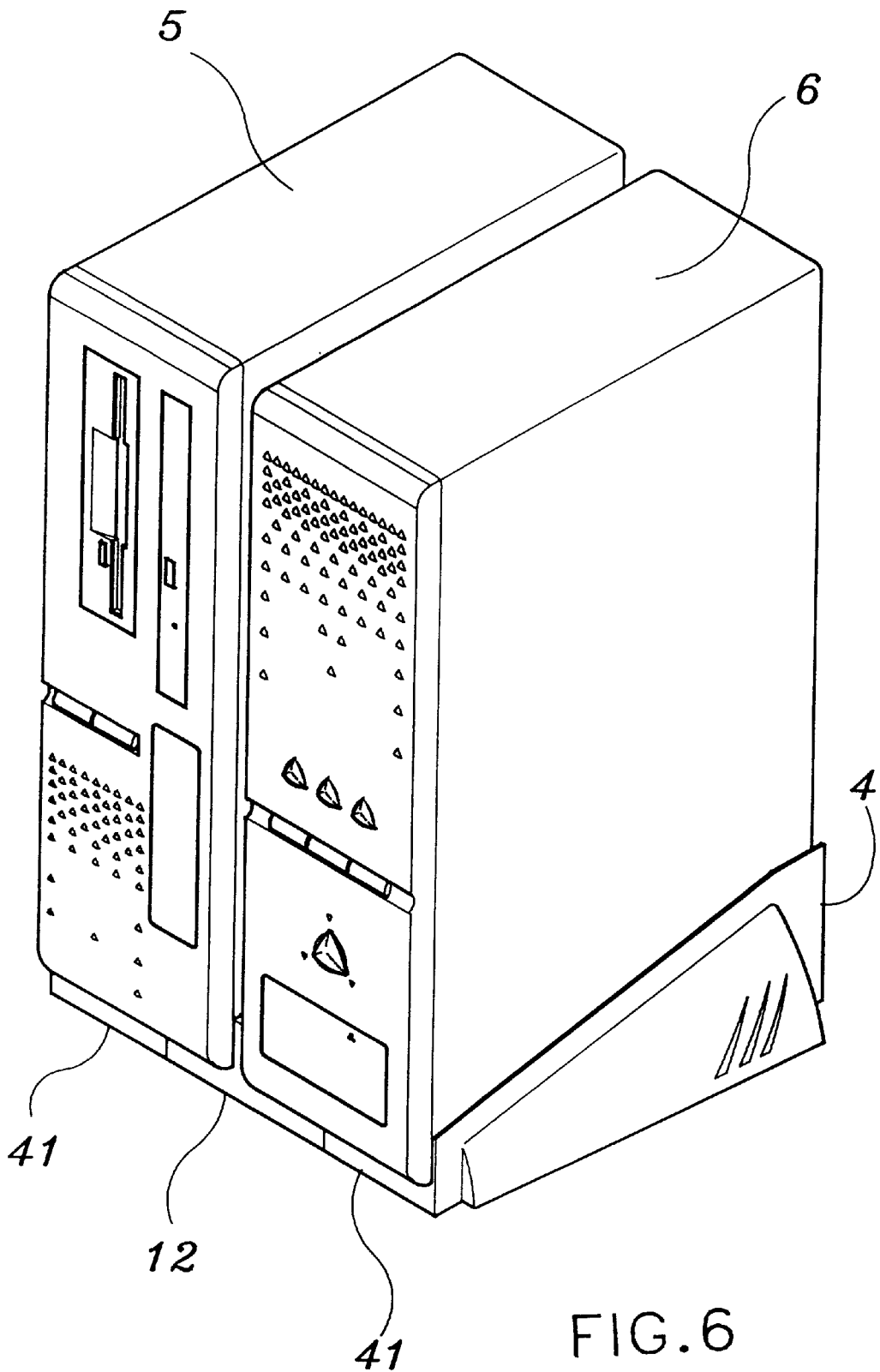
FIG. 6 is an applied view of the present invention, showing a computer mainframe and an expansion unit carried on the combination rack.

Referring to FIG. 6, when the combination rack is assembled, a computer mainframe 5 and an expansion unit 6 that contains extra sockets into which additional printed circuit boards (network card, sound card, modem card, etc.) can be plugged can then be carried on the combination rack and separated by the partition frame 1, and the bus line which is connected between the computer mainframe 5 and the expansion unit 6 can be inserted through the elongated through hole 11 at the partition frame 1.

While only one embodiment of the present invention has been shown and described, it will be understood that various modifications and changes could be made thereunto without departing from the spirit and scope of the invention disclosed. For example, extra partition frames may be connected in parallel between the side frames 4 to hold additional expansion units.

What the invention claimed is:

1. A combination rack comprising:

at least one partition frame, said at least one partition frame having (a) a longitudinally extended partition member with a pair of laterally extending first flat fenders respectively disposed at opposing longitudinal ends of said partition member, each of said pair of laterally extending first flat fenders extending beyond each of a pair of opposing lateral sides of said partition member and having a first coupling flange on each lateral end thereof, (b) a pair of first horizontal coupling plates respectively disposed on said opposing lateral sides of said partition member, each of said pair of first horizontal coupling plates having a pair of longitudinally spaced projecting portions, and (c) a pair of second horizontal coupling plates respectively disposed on said opposing lateral sides of said partition member and adjacent a respective one of said pair of first horizontal coupling plates, each of said pair of second horizontal coupling plates having a raised portion with a pair of longitudinally spaced recesses formed therein;

a pair side frames respectively coupled to opposing lateral sides of said at least one partition frame, each of said side frames having (a) a longitudinally extended side member with a pair of laterally extending second flat fenders respectively disposed at opposing longitudinal ends of said side member, each of said second flat fenders having a second coupling flange formed at a distal lateral end thereof, (b) a third horizontal coupling plate disposed on a respective lateral side of said side member and in correspondence with a respective second horizontal coupling plate of said at least one partition frame, said third horizontal coupling plate having a pair of longitudinally spaced projecting portions extending therefrom and disposed within said recesses of said corresponding second horizontal coupling plate, and (c) a fourth horizontal coupling plate respectively disposed on said respective lateral side of said side member and in correspondence with a respective first horizontal coupling plate of said at least one partition frame, said fourth horizontal coupling plate having a raised portion with a pair of longitudinally spaced recesses formed therein and receiving said projecting portions of said corresponding first horizontal coupling plate therein, said first, second, third, and fourth horizontal coupling plates together defining a base portion of said combination rack, said second coupling flanges of said second fenders being in contiguous sliding contact with corresponding first coupling flanges of respective first fenders; and, means for adjustably coupling said pair of side frames to said at least one partition frame to selectively adjust a lateral dimension of said base portion and thereby adjust a distance between said partition member and each said side member.

2. The combination rack as recited in claim 1 where said adjustable coupling means includes:

a plurality of springy hooks respectively disposed on said pair of second horizontal coupling plates and said fourth horizontal coupling plates; and, a multiplicity of slotted openings formed in said pair of first horizontal coupling plates and said third horizontal coupling plates, each said first and third horizontal coupling plate having a respective plurality of said multiplicity of slotted openings formed in laterally spaced relationship therein, wherein a selected one of said plurality of slotted openings is engaged with a respective springy hook.

3. The combination rack as recited in claim 1 where said adjustable coupling means includes:

a plurality of first screw holes formed in said pair of second horizontal coupling plates and said fourth horizontal coupling plates, each of second and fourth horizontal coupling plate having a pair of said plurality of first screw holes formed in aligned relationship with said recesses thereof; and, a multiplicity of second screw holes formed in said pair of first horizontal coupling plates and said third horizontal coupling plates, each said projecting portion of said first and third horizontal coupling plate having a respective plurality of said multiplicity of second screw holes formed in laterally spaced relationship, wherein a selected one of said plurality of second screw holes is aligned with a respective one of said plurality of first screw holes and said aligned first and second screw holes receive a screw therein.

4. The combination rack as recited in claim 3 where said adjustable coupling means further includes:

a plurality of springy hooks respectively disposed on said pair of second horizontal coupling plates and said fourth horizontal coupling plates; and, a multiplicity of slotted openings formed in said pair of first horizontal coupling plates and said third horizontal coupling plates, each said first and third horizontal coupling plate having a respective plurality of said multiplicity of slotted openings formed in laterally spaced relationship therein, wherein a selected one of said plurality of slotted openings is engaged with a respective springy hook.

\* \* \* \* \*